No. 794,311. PATENTED JULY 11, 1905.
C. P. RANDOLPH.
HAMELESS HORSE COLLAR.
APPLICATION FILED JULY 6, 1903.
3 SHEETS—SHEET 1.
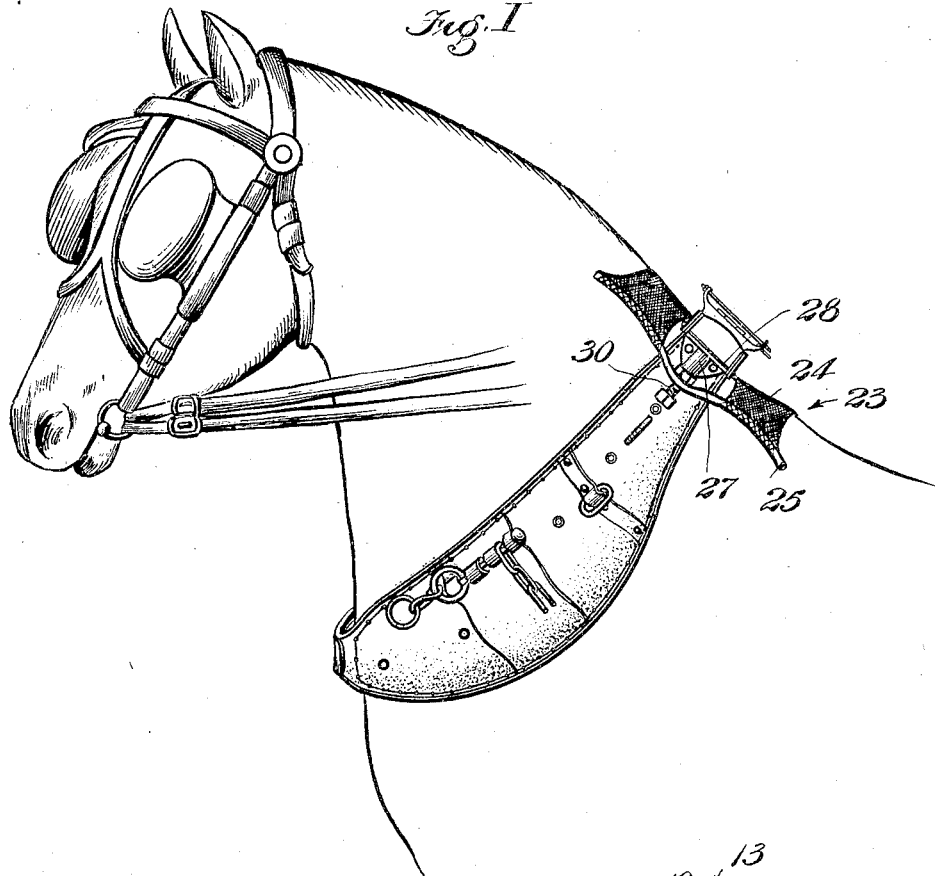
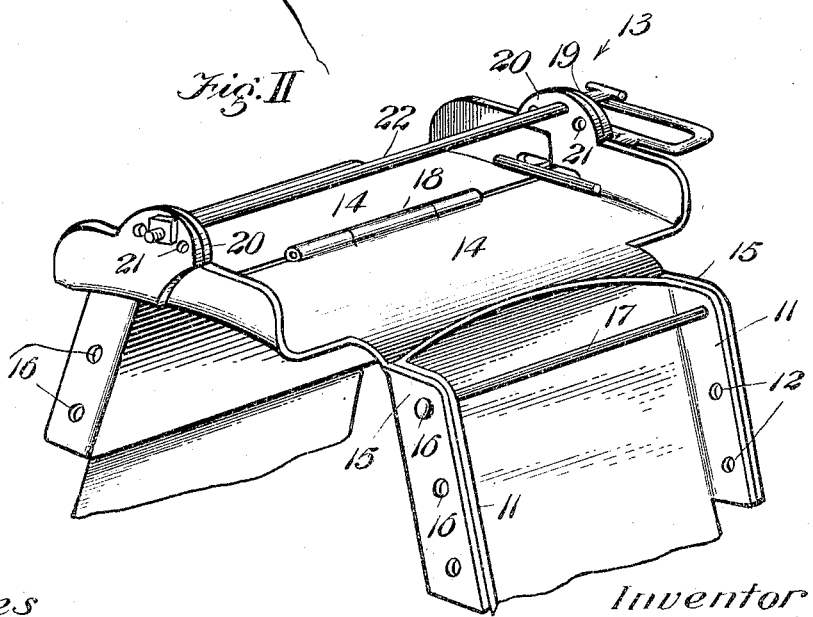

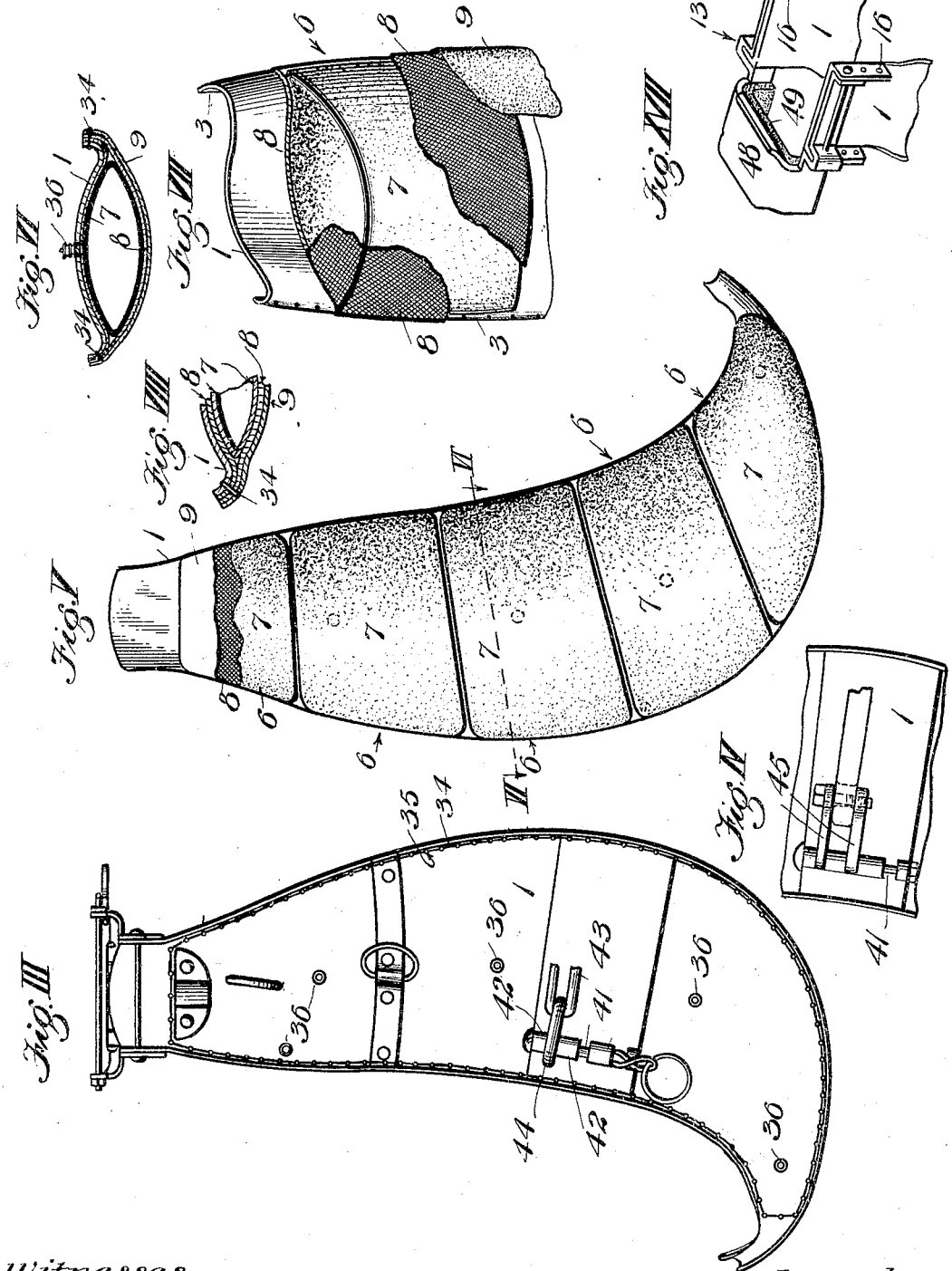

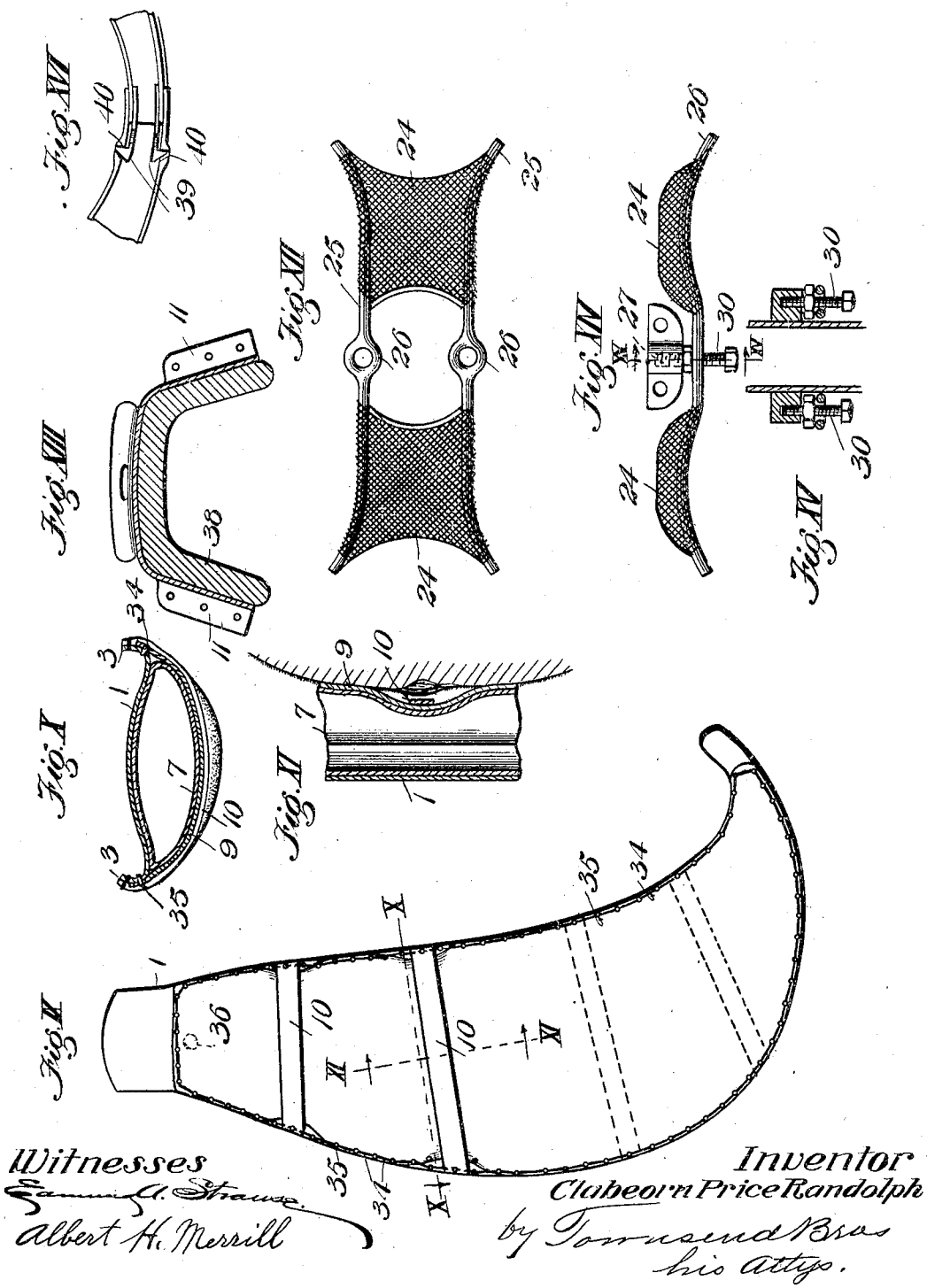

No. 794,311. Patented July 11, 1905.

UNITED STATES PATENT OFFICE.

CLABEORN P. RANDOLPH, OF LOS ANGELES, CALIFORNIA.

HAMELESS HORSE-COLLAR.

SPECIFICATION forming part of Letters Patent No. 794,311, dated July 11, 1905.

Application filed July 6, 1903. Serial No. 164,322.

*To all whom it may concern:*

Be it known that I, CLABEORN P. RANDOLPH, a citizen of the United States, residing at Los Angeles, in the county of Los Angeles and State of California, have invented a new and useful Hameless Horse-Collar, of which the following is a specification.

An object of this invention is to provide a horse-collar which can be used on horses differing greatly in size, so that it will not be necessary for liverymen, teamsters, farmers, &c., to possess a separate collar for each one of their horses, but can use the same collar on any one of a number of horses. I attain this desirable end by providing an improved collar having a wide and accurate range of adjustment, whereby the collar can be fitted to horses differing greatly in size and in form of neck and shoulders.

Another object is to provide a collar in which the body-engaging surface can be varied to conform to any peculiarities in the form of the neck and shoulders of the horse, so as to make allowances for sweenys or other malformations.

Another object is to provide a collar in which the body-engaging surface may be deeply indented to such an extent and at such places as may be necessary in order to relieve the pressure of the collar from a sore or any kind of a protuberance.

Another object is to provide means whereby the weight of the collar may be sustained in such a way as not to make a sore in front of the withers or to relieve the pressure from such a sore if it is already formed.

Another object is to provide means whereby the collar may be quickly and easily put in place and yet securely fastened to the horse. This feature saves much time in harnessing and unharnessing and makes the invention specially valuable to livermen and others who have to harness and unharness large numbers of horses in limited time.

A further object is to provide a pneumatic collar in which the air-receiving compartments are so constructed that when they begin to wear out and will no longer hold air they may be readily opened and supplied with some other suitable filling that will not leak out through a small aperture.

Another object is to provide a collar which will not allow the tugs to rub against the side of the horse.

Collars now in general use are apt to become worn and drawn out of shape by continuous use under the strain put upon them back of the points at which the tugs are attached. In my novel hameless collar a firm outer shell holds the tug out from the body, so that long use will not cause it to rub upon and thereby irritate the sides of the horse.

Another object is to provide a collar-frame such that any desired shape of top or neck pad may be attached.

With these and other objects in view this invention consists of the various constructions and combinations of parts described in the following specification and definitely pointed out in the claims at the close thereof.

The accompanying drawings illustrate the invention.

Figure I is a side view of my improved collar shown in position for use on a horse and furnished with a portion of the attachments which are provided to be used therewith. Fig. II is a perspective view of the device for fastening together the upper extremities of the limbs of the collar. Fig. III is a side elevation of the outside of one limb of the collar. Fig. IV is a fragmental side view showing a form of attachment adapted to be used with leather traces. Fig. V is an elevation of the reverse side of Fig. III. Fig. VI is a cross-section on line VI VI of Fig. V. Fig. VII is a fragmental detail of the inner side of the collar, showing a portion of its interior construction. Fig. VIII is a fragmental view showing the method of attaching the elements of the collar together. Fig. IX is a view of the part shown in Fig. V, showing a modified form of the means for varying the form of the body-engaging surface of the collar. Fig. X is a cross-section of Fig. IX on line X X of Fig. IX. Fig. XI is a fragmental longitudinal section on line XI XI of Fig. IX, showing the manner in which the pressure may be relieved from the sore on the shoulder of the horse. Fig. XII is a top plan view of the device for supporting the weight of the collar, so as to remove the pressure from the part of the neck underneath the upper portion of the collar. Fig. XIII is a sectional view of a different form of top pad and connecting member. Fig. XIV is a side view of the device shown in Fig. XII, including the means for attaching said device to the collar. Fig. XV is a cross-section on line XV XV of Fig. XIV. Fig. XVI is a fragmental sectional detail showing the means for attaching together the lower ends of the limbs to the collar. Fig. XVII is a perspective view showing a modification of the device for relieving the pressure of the collar upon the top of the neck in case of a sore forming in front of the withers.

The collar comprises, in general, two limb members with means for connecting them at their upper and lower ends. The connecting means at the upper end desirably consist of a removable pad member which may be adjustable in width, and the connection at the lower end is detachable, so that the collar may be put on without disturbing the upper connection.

Referring in detail to the drawings, the two limbs of the collar have outer shells 1, which may be of any suitable metal, such as aluminium, and perform the double function of hames and supporting-frames for the body-engaging portions about to be described. Said shells 1 are concave on their inner sides and are preferably provided with flanged edges 3, having a series of perforations 35. Said body-engaging portion of the collar may be composed of a series of pneumatic pads 6. Said pads are each composed of an inner rubber lining 7, surrounded by a canvas covering 8 and together furnished with a leather facing 9, which preferably extends as a continuous strip across the inner side of the whole series of pads on each limb of the collar. The canvas covering is fastened by lacings 34, which pass through perforations 35 in flanges 3 and also serve to fasten the leather facing aforesaid, onto the flanges of the shells, as best shown in Figs. VI and VII. It will be seen that the canvas forms a sack incasing each rubber pad. Both edges of each side of the sack may be fastened to flanges 3, so that when unlaced any suitable filling may be readily inserted. Each of these pad-sacks has a valved duct 36 extending through the metal limb or shell 1, through which air may be forced into or allowed to escape from the pad. Thus all of the pads may be filled out to the full capacity, so as to give an even bearing throughout. In case, however, of a sore spot on the horse or a protuberance that might receive undue pressure the pad that comes opposite such sore spot or protuberance may be only partially inflated or not inflated at all, thus relieving the sore spot or protuberance partially or entirely from pressure. In case of an escape of air from any of the pads, as by a puncture, the corresponding canvas sack may be unlaced and filled by any available stuffing material to give the proper bearing.

Fig. IX shows a modification of the body-engaging portion of the collar, in which said portion is formed as one continuous pneumatic pad, and the supporting-shell is provided with a series of lacing-holes or attaching means 35 for ligatures or bands 10, adapted to extend across different portions of the pad, as shown in said Fig. IX. In using this last form of pad when it is desired to remove the pressure of the collar from a sore on the shoulder of the horse the pad is first deflated and a band 10 is adjusted to come opposite to the sore or other spot from which it is desired to relieve pressure and is drawn taut from side to side between the flanges 3 across the concave side of the shell 1. Then the pad is inflated and will assume a position with relation to the spot on the animal from which pressure is to be relieved. (Best shown in Fig. XI.)

The manner of securing together the upper extremities of the limbs or shells 1 is best shown in Fig. II. Each limb is provided at its upper extremity with a pair of flanges 11, each flange having perforations 12. 13 in a general way designates an upper connecting member provided with hinged parts or arms 14, furnished with flanges 15, having perforations 16. Flanges 15 embrace flanges 11, and the perforations 16 are adapted to register with perforations 12, so that the parts may be adjustably secured together by means of the bar 17. Such adjustment allows of variation in length of the collar. 19 designates a hinge whereby the arms 14 of the part 18 are pivoted together. 19 designates upturned ears with which one arm 14 is furnished. 20 designates corresponding ears with which the other arm is furnished. 21 designates perforations through said ears arranged in a series at each end of the part 13. 22 designates a rod for use in connection with the perforations 21, said rod and perforations together constituting means whereby the arms 14 and the limbs 1 carried thereby may be adjusted at various angles with relation to each other to adjust or vary the width of the upper end of the collar. 23 designates a collar-support comprising pads or webs 24, secured to bars 25, as best shown in Figs. I and XII, said bars having perforations 26. 27 is a socketed part attached by rivets 28 or other suitable means to the upper part of the limbs 1, as best shown in Figs. I, XIV, and XV. A bolt 30 is adapted to be inserted through the perforations 26 and into socket 27, and a nut 31 engaging on said bolt is adapted to bear on top of the bars 25 to support the collar from the web-bearings 24. By adjusting this nut 31 the height of the collar may be varied. This construction brings the weight of the collar to bear forwardly and rearwardly of the collar. The principle of extending the top of the collar laterally, so as to bring the weight to bear at any desired point, may be variously carried out. Thus in Fig. XVII the top member 13, adjustably connected to the side members 1, as above described, has a lateral forward extension 48, that has a pad 49 adjusted to rest on the horse forwardly of the collar. Such a bearing is desirable in case of a sore at the top of the neck where the collar comes.

The upper connecting member 13 is detachable from both of the side limbs, and for general purposes it will be sufficient to provide several such members 13 of different widths and having pads 38, as shown in Fig. XIII, so as to bear directly on top of the horse's neck. In this case the adjustable hinge connection 18 and the separable bearing-pad 24, &c., would not be required. Provision for adjustment as to height would, however, still be made by perforated flanges 11.

The lower end of the collar-links is connected by a detachable or releasable connection—for example, spring clips or catches 39, (see Fig. XVI,) engaging in notches or hasps 40. This end of the collar is desirably extended in a somewhat pointed shape to prevent pressure on the horse's throat.

The traces may be attached to the collar by any suitable means—for example, by a fastening-pin 41 engaging through a series of sockets 42, arranged in line on the shell 1, the end link 44 of the trace 43 being placed between two of these sockets 42 and the pin 41 then inserted.

What I claim, and desire to secure by Letters Patent of the United States, is—

1. A horse-collar provided with a body-engaging portion adapted to receive a removable filling, and ligatures extending transversely of the collar for varying the bearing-face of said portion.

2. In a horse-collar, a pair of limbs, hinged members pivotally connected together, adjustable fastening means connecting said hinged members to adjust the angle thereof, and means for vertically adjusting said limbs with respect to said members.

3. In a horse-collar, a limb provided at its upper extremity with flanges having perforations arranged in a series extending longitudinally of the limb, a support for said limb provided with flanges engaging with the first-named flanges having perforations adapted to register with the first-named perforations, and a bar extending through said perforations to adjustably secure said limb to said support.

4. In a horse-collar, a pair of limbs, means for securing said limbs together at their upper extremities, an apertured body-engaging support adapted to fit over said means and extending beyond said means to engage the neck of the horse, and vertically-adjustable attaching means for removably securing said support to the limbs.

5. In a horse-collar, a pair of limbs, a socketed member carried by said limbs, a collar-support comprising a frame having perforated side pieces, a bolt adapted to enter said perforation and said socketed member, means limiting the entrance of the bolt into the socket, and an adjusting-nut on said bolt.

6. A horse-collar comprising side limbs, means for adjustably connecting said limbs at their upper ends, a top pad adjustably connected to the upper ends of said limbs and a detachable connection for the lower ends of said limbs.

In testimony whereof I have signed my name to this specification, in the presence of two subscribing witnesses, at Los Angeles, in the county of Los Angeles and State of California, this 27th day of June, 1903.

CLABEORN P. RANDOLPH.

Witnesses:
ALBERT H. MERRILL,
F. M. TOWNSEND.